United States Patent [19]

Matsumi

[11] 4,382,994

[45] May 10, 1983

[54] POLYACETAL RESIN MOLDED ARTICLE HAVING REDUCED WATER CONTAMINATION

[75] Inventor: Kenzi Matsumi, Fuji, Japan

[73] Assignee: Polyplastics Co., Ltd., Osaka, Japan

[21] Appl. No.: 363,786

[22] Filed: Mar. 31, 1982

Related U.S. Application Data

[63] Continuation of Ser. No. 269,806, Jan. 3, 1982, abandoned, which is a continuation of Ser. No. 83,090, Oct. 9, 1979, abandoned.

[30] Foreign Application Priority Data

Oct. 25, 1978 [JP] Japan .............................. 53-131432

[51] Int. Cl.$^3$ .......................... B32B 9/04; C08G 2/10; B29C 25/00
[52] U.S. Cl. .................................. 428/411; 264/241; 264/340; 264/345; 428/421; 428/447; 428/484; 428/524; 525/400; 528/232
[58] Field of Search ............... 428/411, 437, 522, 524, 428/536, 447, 484; 528/241, 230, 232; 260/33.4 R, 18 R, 29.1 SB; 525/400, 410; 252/56 R; 264/239, 241, 340, 345

[56] References Cited

U.S. PATENT DOCUMENTS

| | | | |
|---|---|---|---|
| 2,989,509 | 6/1961 | Hudgin et al. | 528/241 X |
| 3,027,352 | 3/1962 | Walling et al. | 528/241 |
| 3,137,669 | 6/1964 | Bragaw, Jr. | 260/33.4 R |
| 3,306,953 | 2/1967 | Fourcade et al. | 525/400 |
| 3,340,219 | 9/1967 | Stemmler | 260/32.6 R |
| 3,459,709 | 8/1969 | Ackermann et al. | 525/400 |
| 3,484,399 | 12/1969 | Kakos, Jr. | 260/18 R |
| 3,484,400 | 12/1969 | Halek | 260/18 R |
| 3,485,799 | 12/1969 | Park | 525/410 |
| 3,488,303 | 1/1970 | Heinz | 260/18 R |
| 3,491,048 | 1/1970 | Sargent | 260/29.1 SB |
| 3,743,614 | 7/1973 | Wolters et al. | 260/18 R |
| 3,808,133 | 4/1974 | Brown | 252/56 R |
| 4,105,037 | 8/1978 | Semanchik et al. | 528/241 |
| 4,161,557 | 7/1979 | Suzuki et al. | 428/437 |
| 4,180,620 | 12/1979 | Inskip | 428/522 X |

*Primary Examiner*—Thomas J. Herbert, Jr.
*Attorney, Agent, or Firm*—Maria C. H. Lin

[57] ABSTRACT

A polyacetal resin molded article having reduced water contamination is disclosed. The water contamination reduction feature is provided by the inclusion of a substantially water insoluble substance which forms a hydrophobic film on the molded article. It is furthermore required that the water insoluble substance-included polyacetal molded article be heat treated in air or in an inert gas to provide reduced water contamination.

21 Claims, No Drawings

POLYACETAL RESIN MOLDED ARTICLE HAVING REDUCED WATER CONTAMINATION

CROSS-REFERENCE TO RELATED APPLICATIONS

This application is a continuation of application Ser. No. 269,806, filed Jan. 3, 1982, now abandoned, which is a continuation of application Ser. No. 83,090, filed Oct. 9, 1979, now abandoned.

The present invention relates to a polyacetal molded article having reduced water contamination.

Materials having contact with water such as water taps, food processing devices and medical instruments, are required to have excellent resistance to water contamination.

Polyacetal resins, composed mainly of polyoxymethylene, have excellent moldability, mechanical strength and durability. For these reasons they are broadly used as functional parts in many fields.

These properties are desirable. However, molded polyacetal parts which contact water present a problem. There is the danger of contaminating contacted water with formaldehyde and the like and therefore, application of polyacetal resins to this field is remarkably restricted.

This problem has been explored with the goal of reducing water contamination by polyacetal resins. It has been found that when an appropriate additive is added to the resin composition and the resultant molded article subjected to post treatment, the water-contaminating property of polyacetal resins is remarkably reduced.

In the field of city water piping and fittings and medical instruments, where the use of molded polyacetal resin articles have heretofore not been encouraged, polyacetal resin molded articles of the present invention can now be used effectively. Thus, the above-mentioned excellent properties of polyacetal resins can be utilized. Also, parts and members employed in sewarage and hot spring equipment, where polyacetal resin molded articles have heretofore been used, polyacetal resin molded articles of the present invention can now be used with increased reliability.

The polyacetal resin molded articles of the present invention are characterized by employing a polyacetal resin containing a substantially water insoluble substance capable of forming a hydrophobic film on a molded article by a post treatment conducted after the molding operation. This polyacetal resin is molded into the desired shape and then heat treated in air or an inert gas.

Polyacetal molded articles produced in the manner described above have a surface layer texture more compact and finer than conventional polyacetal molded articles. Because a hydrophobic film is formed on the surface layer portion, or the skin layer thereof, migration of formaldehyde or the like into water is reduced and significantly controlled. As a result, deterioration of two polyacetal resin by water, especially water containing chlorine, acid or the like, is substantially diminished. Accordingly, the water-contaminating property of polyacetal resins is remarkably reduced.

There are two important types of polyacetal resins. They are the homopolymer and the copolymer. A polyacetal resin is characterized as a homopolymer or a copolymer based on the structure of the main chain. Furthermore, polyacetal resins are either ether-terminated or ester-terminated type resins. Any type of a polyacetal resin can be used as the starting resin material in the present invention. However, homopolymers, especially ester-terminating homopolymers, are poor in long-time durability. Therefore, it is preferred to use an ether-terminated polymer, especially an ether-terminated copolymer.

It is known that these preferred polyacetals are obtained by copolymerization of trioxane with a cyclic ether or the like or by reaction of a monopolymer with diethylene glycol or the like.

A resin marketed under the tradename "Duracon" by Polyplastics (Kabushiki Kaisha) is especially preferred. In order to improve stability, a phenol type antioxidant and such substances as a polyamide, an amidine and a metal soap are ordinarily incorporated into a resin of this type.

An ester type antioxidant marketed under the tradename "Irganox 1010" or "Irganox 259", very low in water solubility, is preferred as the antioxidant. A polyamide and a metal soap are preferred for decreasing dissolution of formaldehyde. A non-toxic calcium salt of a higher fatty acid such as lauric acid, myristic acid, palmitic acid, stearic acid, linoleic acid or hydroxystearic acid is effective as a hydrophobic film-forming substance. Accordingly, a calcium salt of this type is especially preferred.

The water insoluble, hydrophobic film-forming substance of the present invention is a barely water soluble substance comprising, as the main constituent, a hydrocarbon, halogenated hydrocarbon or polysiloxane group. Specific examples of such substances are silicone oils such as methyl silicone, phenyl silicone and fluorine-modified silicone, halogenated hydrocarbons such as fluorinated oil, hydrocarbons such as a paraffin, a low-molecular weight polyolefin and terphenyl, higher fatty acid amides, higher fatty acid bisamides such as ethylene bis-stearomide, higher fatty acid esters such as tristearin, higher fatty acid ethers, higher alcohols such as stearly alcohol, and metal soaps such as calcium hydroxystearate.

These substances may be used alone or as a mixture of two or more of them. The use of a mixture of two or more of the foregoing substances is preferred because this prevents formation of white powder on the surface layer.

Incorporation of the hydrophobic film-forming substance may be accomplished by homogeneously kneading the polyacetal resin with the hydrophobic film-forming substance. Alternately, some or all of the hydrophobic film-forming substance may be added during the molding step. Use of a master batch is preferred.

The water insolubility effect is increased as the quantity of the hydrophobic film-forming substance added is increased. However, if the substance is incorporated in too large a concentration, the moldability and other properties of the polyacetal resin are degraded and the film formed on the surface of the molded article is very sticky, resulting in reduction of the commercial value. In view of the foregoing, it is preferred that the hydrophobic film-forming substance be incorporated in an amount in the range of between about 0.01 and 2% by weight, based on the total weight of the resin composition and thus the total weight of the molded article, more preferably in the range of between about 0.05 and 1% by weight, and especially preferably in the range of between about 0.2 and 1% by weight. If the amount of the hydrophobic film-forming substance added is less, an effect proportional to the amount added is attained. When reduction in moldability and the like is of no significance, large concentrations of the hydrophobic film-forming substance may be incorporated into the molding resin. The heat treatment of the molded article is carried out in air or in inert gas such as nitrogen. Heat treatment in an oil or water is not preferred because a water-resistant surface layer is not formed. Further, the heat treatment under vacuum is not preferred because the heating effect is ineffectual. From the viewpoint of heat treatment efficiency, higher temperatures are preferred, but too high a temperature is not practical because deformation of the molded article, caused by softening of the polyacetal resin, results.

In view of the foregoing, it is preferred that the heat treatment be carried out at a temperature ranging from 80° C. about to a level lower by about 20° C. than the melting point of the film-forming substance-containing polyacetal, particularly from 100° to 180° C. When the heat treatment step is carried out at a temperature within the above preferred range, best results are attained.

The time during which the molding resin is exposed to heat treatment varies to some extent depending on the desired level of the water contamination resistance and the heat treatment temperature. However, a heating time of at least 1 hour is sufficient unless the heat treatment temperature is extremely low. The maximum heat treatment effect is obtained if the heat treatment is conducted for about 3 hours. When the heat treatment is carried out at a relatively low temperature of 80° to about to 100° C., it is preferred that the heat treatment be conducted for at least 2 hours.

The heat treatment can be accomplished by using an ordinary hot air drier. It is possible to attain high efficiency when a tube apparatus, designed so that hot air contacts the inner face of the tube, is used.

A coloring agent, a filter and a reinforcer may also be added to the polyacetal molded article of the present invention. Further, a polyolefin, ABS, a polyamide, a polyester or polyurethane or other thermoplastic resin may be blended into the polyacetal resin.

Blending of a polyurethane or the like is effective for improving the impact resistance of the resulting molded article, and incorporation of a flake-like filler, such as mica or glass flake, improves the water resistance of the molding resin.

The present invention will now be described in detail by reference to the following examples. In all the examples a disc having a diameter of 10 cm and a thickness of 3 mm was prepared as a sample of the polyacetal molded article. The disc was tested by washing the disc with water for about 1 hour and the disc was thereafter allowed to stand in water at room temperature for 24 hours under conditions such that the ratio of the surface area of the disc to the quantity of contacted water was 3,000 cm$^2$/l. Then, the formaldehyde content of water used was determined by the acetylacetone method.

COMPARATIVE EXAMPLE 1

To an acetal copolymer (Duracon M90 manufactured by Polyplastics Kabushiki Kaisha) was added 0.5% of 2,2'-methylene-bis-(4-methyl-6-tert-butylphenol) and a polyamide (Zytel 63 manufactured by DuPont de Nemours and Co.). A disc, having the above-mentioned dimension was prepared from this resin composition by injection molding and the formaldehyde content in water was determined according to the above-mentioned method. 1.5 ppm of formaldehyde was detected.

COMPARATIVE EXAMPLE 2

A disc was prepared in the same manner as described in Comparative Example 1 except that a terminal-acetylated homopolymer was used as the polyacetal. The formaldehyde level in water was determined according to the above-mentioned method. 2.1 ppm of formaldehyde was detected.

COMPARATIVE EXAMPLE 3

A disc was prepared in the same manner as described in Comparative Example 1 except that 0.1% of dicyandiamide was incorporated in the acetal copolymer instead of the polyamide used on Comparative Example 1. 3.0 ppm of formaldehyde was detected.

COMPARATIVE EXAMPLE 4

A disc was prepared in the same manner as described in Comparative Example 1 except that 0.5% of microcrystalline wax was further added to the polyacetal. The water-contaminating property was evaluated in the same manner as in Comparative Example 1. 1.3 ppm of formaldehyde was detected.

COMPARATIVE EXAMPLE 5

The molded article obtained in Comparative Example 3 was heated for 3 hours in hot air maintained in a temperature of 100° C. in a hot air drier. The water-contaminating property of the heated molded article was evaluated. 0.9 ppm of formaldehyde was detected.

EXAMPLE 1

The molded article obtained in Comparative Example 4 was heated for 3 hours in hot air at 100° C., and the water contaminating property was evaluated. It was found that the formaldehyde level was lower than the detection limit.

EXAMPLE 2

A disc was prepared in the same manner as in Comparative Example 2 except that 1% of a methylsilicone oil (Toray Silicone SH 200) was further added to the polyacetal. The disc was heat-treated at 130° C. for 1 hour. The formaldehyde dissolution test was conducted according to the above-mentioned method. It was found that the formaldehyde level was lower than the detection limit.

EXAMPLE 3

A pellet was prepared by extrusion from an acetal copolymer (Duracon M90) containing 0.5% of Irganox 1010, 0.1% of calcium hydroxystearate and 0.1% of a fluorinated oil (Daifluoil #100). The molded pellet was treated at 100° C. for 3 hours. The water contamination property was evaluated. It was found that the formaldehyde level was below the detection level.

EXAMPLE 4

A disc was prepared by extrusion from an acetal copolymer (Duracon M90) containing 0.5% of 2,2'-methylene-bis-(4-methyl-6-tert-butylphenol), 0.1% of calcium hydroxystearate and 0.2% of ethylene bis-stearoamide. The disc was heated at 100° C. for 3 hours by hot air. The same formaldehyde dissolution test was conducted. It was found that the formaldehyde level was lower than the detection level.

EXAMPLE 5

A disc was prepared from the acetal copolymer (Duracon M90) containing 0.5% of 2,2'-methylene-bis-(4-methyl-6-tert-butylphenol), b 0.5% of a polyamide (Zytel 63) and 0.5% of stearyl alcohol. The disc was heat-treated at 120° C. for 2 hours. The formaldehyde dissolution was carried out. It was found that the formaldehyde level was lower than the detection level.

EXAMPLE 6

A disc was prepared in the same manner as in Example 5 except that 0.2% of tristearin was used instead of stearyl alcohol. The disc was heat-treated and tested in the same manner as in Example 5. It was found that the formaldehyde level was lower than the detection limit.

What is claimed is:

1. A polyacetal resin molded article which exhibits reduced water contamination when in contact with water, said molded article bearing a hydrophobic film upon the surface thereof, said molded article being formed by molding a substantially homogeneous polyacetal resin composition comprising an intimate admixture of a polyacetal resin and a substantially water insoluble substance selected from the group consisting of paraffins, silicon oils, fluorinated oils, metal soaps, higher fatty acid bisamides, higher alcohols, higher fatty acid ethers, and mixtures of two or more of the above, and heating said molded article in air or an inert gas to a temperature within the range of about 80° C. to 130° C. whereby said water insoluble substance forms said hydrophobic film.

2. The article of claim 1 wherein said water insoluble substance is present in a concentration in the range of from about 0.01% and 2% by weight, based on the weight of said polyacetal resin.

3. The article of claim 2 wherein said water insoluble substance is present in a concentration in the range of from about 0.05% and 1% by weight, based on the weight of said polyacetal resin.

4. The article of claim 3 wherein said water insoluble substance is present in a concentration in the range of from about 0.2% and 1% by weight, based on the weight of said polyacetal resin.

5. The article of claim 1 wherein said article is heated for a period of at least 1 hour.

6. The article of claim 5 wherein said article is heated at a temperature within the range of from 100° to 130° C.

7. The article of claim 5 wherein said article is heated for a maximum time period of about 3 hours.

8. A molded article comprised of a polyacetal resin which exhibits reduced water contamination when in contact with water as well as hydrophobic surface properties, said article being prepared by molding a substantially homogeneous polyacetal resin composition comprising an intimate admixture of said polyacetal resin and a substantially water insoluble substance selected from the group consisting of paraffins, silicon oils, fluorinated oils, metal soaps, higher fatty acid bisamides, higher alcohols, higher fatty acid ethers and mixtures of two or more of the above, and heating said molded article in air or in an inert gas to a temperature within the range of about 80° C. to 130° C. whereby said hydrophilic surface properties are provided.

9. The article of claim 8 wherein said water insoluble substance is present in a concentration in the range of from about 0.01% and 2% by weight, based on the weight of said polyacetal resin.

10. The article of claim 9 wherein said water insoluble substance is present in a concentration in the range of from about 0.05% and 1% by weight, based on the weight of said polyacetal resin.

11. The article of claim 10 wherein said water insoluble substance is present in a concentration in the range of from about 0.2% and 1% by weight, based on the weight of said polyacetal resin.

12. The article of claim 8 wherein said article is heated for a period of at least 1 hour.

13. The article of claim 12 wherein said article is heated at a temperature within the range of from 100° to 130° C.

14. The article of claim 12 wherein said article is heated for a maximum time period of about 3 hours.

15. A method for forming a molded article comprised of a polyacetal resin bearing a hydrophobic film thereon and which exhibits reduced water contamination when in contact with water, said method comprising forming a molded article comprised of an intimate admixture of said polyacetal resin and a substantially water insoluble substance selected from the group consisting of paraffins, silicon oils, fluorinated oils, metal soaps, higher fatty acid bisamides, higher alcohols, higher fatty acid ethers and mixtures of two or more of the above, and heating said molded article in air or in an inert gas to a temperature in the range of about 80° C. to 130° C. whereby said water insoluble substance forms said hydrophobic film.

16. The method of claim 15 wherein said water insoluble substance is present in a concentration in the range of from about 0.01% and 2% by weight, based on the weight of said polyacetal resin.

17. The method of claim 16 wherein said water insoluble substance is present in a concentration in the range of from about 0.05% and 1% by weight, based on the weight of said polyacetal resin.

18. The method of claim 17 wherein said water insoluble substance is present in a concentration in the range of from about 0.2% and 1% by weight, based on the weight of said polyacetal resin.

19. The method of claim 15 wherein said article is heated at a temperature within the range of 100° to 130° C.

20. The method of claim 19 wherein said article is heated for a period of at least 1 hour.

21. The method of claim 19 wherein said article is heated for a maximum time period of about 3 hours.

* * * * *